United States Patent Office 3,702,775
Patented Nov. 14, 1972

3,702,775
DIFFUSE REFLECTIVE COATING
John W. Stuart, Silver Spring, Md., assignor to the United States of America as represented by the Administrator of the National Aeronautics and Space Administration
No Drawing. Filed Feb. 12, 1971, Ser. No. 115,134
Int. Cl. C03c 1/00
U.S. Cl. 117—35 R    10 Claims

ABSTRACT OF THE DISCLOSURE

An improved non-specular diffuse, reflective coating is provided by coating a substrate with a composition of a highly reflective, crystalline inorganic salt and a liquid vehicle of a solvent having limited solvent activity for the salt, a non-solvent wetting agent, and a relatively volatile dispersant-drying agent, and drying the coating. Excellent results have been obtained when the salt is sodium chloride, the solvent is a diol with not more than one terminal hydroxy group, the non-solvent is xylene or toluene, and the drying agent is ethanol or isopropanol.

The invention described herein was made by an employee of the United States Government and may be manufactured and used by or for the Government for governmental purposes without the payment of any royalties thereon or therefor.

BACKGROUND OF THE INVENTION

The present invention relates to a composition and method for the formation of a reflective coating formed generally from inorganic materials, and more particularly to the provision of an easily applied, mechanically durable, chemically and optically stable, reflective coating particularly useful in the measurement of optical reflectance.

A number of optical measurements require means for reflecting light with a uniform distribution and with minimum absorption. Typical in the making of such measurements is the utilization of an integrating sphere, in a reflectometer having earth and space applications, to measure diffused reflected light intensity. An integrating sphere is a closed cavity, ordinarily formed from two hemispheres, into which the light to be measured is introduced via a first aperture therein, causing the cavity to be illuminated on the interior surfaces. The intensity of the illumination is measured by a photocell placed in a second aperture in the sphere. To function effectively, the inner surface must be diffuse and highly reflective.

The technique generally employed involves burning or smoking magnesium metal in air to produce magnesium oxide, which is deposited on the interior surface of the sphere. The process is very tedious and exacting, requiring considerable time and expertise. The life of the surface coating thus provided is limited; therefore, the surface coating must be replaced even under ideal operating conditions about once a year. Further, the magnesium oxide must be produced by combustion under very tightly controlled conditions of burning a magnesium metal ribbon, and the process proceeds at an extremely low rate of deposition. The coating should be at least about 3 to 4 millimeters thick to provide the required characteristics over a wide spectrum band wave, particularly in the near infrared, i.e., 0.7 to 2.4 microns wavelength.

Smoked magnesium oxide coatings are extremely fragile, having very poor adhesion and cohesion, and, in addition, especially difficult to apply, trim, and use. Further, any errors in the formation of such a coating or any damage during application or thereafter would require that the entire coating be replaced. Moreover, magnesium oxide reacts chemically with water at room temperature to produce a stable hydroxide phase, brucite. Such a hydrated phase serves to reduce the reflectance of the coating, particularly in the near infrared region. More significantly, the hydrated phase makes the optical properties of the coating variable with respect to time and results in a poor standard of reference for the measurement of light. Magnesium oxide coatings also give partially specular reflectance, which is not desirable.

It has been attempted, upon numerous occasions, to employ materials other than magnesium oxide, and to use techniques which are more rapid and readily reproducible than the smoking procedure involved in burning magnesium ribbon. Invariably, however, such efforts have proved inferior to the employment of the smoked magnesium oxide, which has a total reflectance of about 96% in the solar region.

In particular, it has been attempted to utilize sodium chloride in an ethanol vehicle (190 proof) to form such a reflectance coating on a flat surface. The coating proved generally unsuccessful, since only marginal cohesion of the NaCl crystals resulted. In addition, the coating had other deficiencies; notably, rather than being hard and durable, it proved to be soft and friable, and was susceptible to damage by even rather slight vibration, touch on even ordinary handling procedures. Moreover, it was necessary to roughen and preheat the substrate before applying the coating. A further deficiency was the extremely large number of very thin layers required to attain an even, uniform density surface coating.

It is an object of the present invention to provide a diffuse reflective coating, suitable for use in integrating spheres and the like, which will provide better chemical and optical stability, improved mechanical durability, longer useful service life, greater ease of formation of the coating, reduced thickness and material requirements, and ease of maintenance, repair, and cleaning, and which provides nonspecular reflectance. These and still other objects, as will become apparent from the following disclosure, are attained by the invention herein.

SUMMARY OF THE INVENTION

It has now been found that a variety of generally inorganic materials can be formed into reflective coatings by the formulation of a liquid coating composition comprising a highly reflective inorganic salt, preferably sodium chloride, in combination with a vehicle of a solvent having a limited level of solubility of the salt, a liquid non-solvent wetting agent for said salt, and a volatile liquid dispersant-drying agent. The liquid coating composition can be applied, by standard wet spraying procedures under controlled atmospheric conditions of temperature and relative humidity, onto a prepared substrate and dried under controlled conditions of temperature and humidity to provide a highly reflective diffuse coating. The liquid components of the coating composition operate cooperatively to enable the inorganic salt to function as its own binder or cement by controlling crystalline development in proper proportions of primary and secondary growth, as is more fully described hereinafter. Each aspect of the invention is hereinafter discussed in considerable detail.

DETAILED DESCRIPTION OF THE INVENTION

The inorganic salt from which the coating is formed must have a high level of non-specular reflectivity, be a material which is transparent, i.e., non-light-absorbing in single crystal form, and have a high index of refraction. The salt must also have smooth cleavage or growth surfaces on its grains, be in finely divided powder form, and must have a high level of chemical stability, i.e., it must lack a room temperature stable hydrated phase and be low in deliquescence. The salt must further be stable to the optical radiations involved in the utilization of the reflective coating. In addition, partial solubility in some liquid is required so that the material may be readily dispersed and dried with reasonable cohesion and adhesion through the development of crystal growth to form a coating of high reliability. The material should also have a high mechanical stability, i.e., adhesion, cohesion, hardness, and the like.

After examining a large selection of alkali metal and alkaline earth metal halides, sulfates, carbonates, oxides and other salts, a number of compounds were found to meet the foregoing criteria, especially including NaCl, $BaSO_4$, $Na_2SiF_6$, $BaCO_3$, NaF, $BaF_2$, KCl, and $Al_2O_3$. The material having the highest reflectance throughout the solar spectral region, particularly in the infrared, and which meets all the foregoing criteria was sodium chloride. Others of the aforementioned can be more useful, either individually or in mixtures thereof, when specific wavelength areas of the solar spectrum are under examination; but for general, wide spectrum usage, sodium chloride is vastly preferred.

The selection of an appropriate vehicle for the inorganic salt is the most important aspect in the formation of the coating. Application of the coating requires a vehicle which will permit a smooth wet application of the reflective material without running or slumping. Drying of the coating requires sufficient plasticity so that it can shrink uniformly without cracking or crazing. Hence, a controlled evaporation rate is required. The final physical properties of the coating, e.g., cohesion, adhesion, hardness of the surface layer, and the like, are dependent upon the effectiveness of the self-binding action of the inorganic salt—in the present instance, crystal growth, both secondary, i.e., overgrowth on and between existing grains, and primary, i.e., new grains chemically bound to existing grains and one another—which is promoted by the appropriate vehicle.

A number of solvent dispersant combinations were investigated employing a liquid, having a limited degree of solvent activity with respect to the inoragnic salt, combined with another liquid having slight solvation power with respect to the inorganic salt. It was determined that the best results were attained by the utilization of a combination of a diol or glycol solvent, having not more than one of its hydroxyl groups in a terminal position, and a relatively volatile alcohol. It was also found preferable to include in the combination an inert, non-solvent dispersant, such as, for example, xylene, toluene, tetraline, cellusolves, and the like to complete the vehicle.

Diols, in general, have solvent activity levels—i.e., solvent and dispersing action with regard to most inorganic salts—which promote the critical primary and secondary crystal growth necessary to attain good adhesion and cohesion, and which permits the formation of a hardened durable surface on the finished coating. Too high an activity level of the solvent component, however, results in cracking or crazing of the coating. Too little activity, on the other hand, yields a soft, chalking, fragile coating. The diol serves to control wetness and the drying rate, while maintaining coating plasticity through dipole interactions with the inorganic salt. It has been found that diols having two terminal hydroxyl groups, e.g., 1,2-ethanediol, 1,3-propanediol, 1,4-butanediol and the like are unfavorable because they have too high an activity level for convenient employment or suitable control of the drying rate to permit the necessary development of the crystalline structure. On the other hand, those diols having only one terminal hydroxyl group, or those having no terminal hydroxyl groups, have lower activity levels and, accordingly, can be successfully employed as the principal vehicle component. Examples of such diols include 1,2-propanediol, 1,3-butanediol, and 2,3-butanediol.

An alcohol is also included in the vehicle, and primarily serves as a dispersing and drying agent. Any alcohol having minimal water absorption and high volatility can be employed, but ethanol or propanol, either normal or isopropyl are preferred.

The final component of the vehicle is a substantially inert liquid non-solvent medium with respect to the reflective inorganic salt. Any organic liquids generally classified as solvents or dispersants with a boiling point in the range of about 100 to 175° C. can be employed depending upon the alcohol drying agent. The inert (inactive) liquid medium is chosen to control the characteristics of application and drying of the coating and serves primarily as a wetting agent, and, secondarily, as a dispersant. The following are preferred examples of such materials: xylene, toluene, tetraline, cellusolve, and the like.

In the preparation of the coating composition, the components may be merely combined, although it is preferable that the inorganic salt, e.g., sodium chloride, is ball milled or mulled with the primary dispersing medium, e.g., ethyl alcohol, preferably for a period of about one to three days prior to the addition of the other vehicle components. In any event, the sodium chloride should be in finely divided particulate form, basically the finer the better. The dispersion of the inorganic salt in, for example, the alcohol, can be stored indefinitely, so long as proper precautions are taken to prevent evaporation of the alcohol. Just prior to use, the remaining vehicle components are added. The coating composition should be used within a relatively short period of time, e.g., up to about three days, after the diol component is added, since recrystallization phenomena can adversely affect the properties of the composition.

The relative proportions of the various components are not narrowly restrictive. It is important, however, to provide sufficient diol so that, upon drying of the coating, sufficient crystal formation occurs. Generally, the diol should be present in an amount corresponding to about 16.7 to 150% based on the weight of the inorganic salt. The realtive proportions of the non-solvent and of the dispersing agent are dictated by the required drying rate and spraying characteristics of the formulation.

Generally speaking, the resultant coating can be applied to any substrate material. It has already found application on aluminum, steel, plastics, wood, and the like. It is preferred to clean and precoat the substrate with a barrier film, such as an alkali-metal silicate or a silicone resin, before application of the coating, particularly where the constituents of the substrate tend to migrate into and discolor the finished coating. It has been found that various commercially available silicone resins, such as, for example, General Electric's GE 602, perform well as the barrier film.

The coating is preferably applied by conventional wet spraying techniques at a relative humidity of from about 35 to 10%, with 20% relative humidity being most preferred. It has been found that best results accrue when the coating is formed by the application of a plurality of layers, each on the order of and generally not greater than about ½ millimeter thick. Each layer is given an initial drying between coats at a moderate temperature on the order of about 40° C. for a period of about 5 to 10 minutes.

After the application of the final layer, the coating is initially dried under low humidity conditions at ambient temperature for several hours, e.g., at least about four hours, and conveniently overnight. If the edges of the substrate to which the coating has been applied are to be trimmed or otherwise modified, this is best done at this time.

After the initial drying, followed by any trimming, the coating is placed in a circulating oven at a temperature of about 40 to 50° C. until the coating has lost its initial grey appearance and has turned white, i.e., a period of about two days. Thereupon, the oven temperature may be slowly raised, e.g., about 10° C. per day, to about 70 to 90° C. The maximum temperature of the "bake out" will depend upon the relative thermal coefficients of expansion between the coating and the substrate. The "bake out" period serves to remove the final vestiges of the solvents and wetting and dispersing agents. The finished coating should be cooled slowly before removing it from the oven.

In the event of damage to the coating, either during the drying procedure or in use, it can be repaired by applying a stiff paste of the coating composition, containing lesser amounts of wetting and dispersing agents and non-solvent to provide a thicker formulation, followed by drying at an elevated temperature of about 50° C. for about 24 hours.

If, after use, it becomes desirable to resurface the coating, a relatively thin layer can be applied on the surface preferably employing a coating solution of only the inorganic salt and ethanol.

DESCRIPTION OF THE PREFERRED EMBODIMENT

As has been mentioned above, sodium chloride is the preferred inorganic salt, both for its excellent reflective properties and the physical characteristics of the coating attained therewith. The preferred formulation of sodium chloride coating compositions for employment in the present invention will generally include about 10 to 30 weight percent sodium chloride; 5 to 15 weight percent of the diol solvent, e.g., propylene glycol or butanediol; about 0 to 20 weight percent of the non-solvent, e.g., xylene or toluene; and about 40 to 80 weight percent of an alcohol, preferably ethanol or isopropanol.

A preferred embodiment of the technique, and a specific formulation of the coating composition, utilizing commercially available, pure ingredients, are illustrated in the following examples:

Example 1

An alumina ball milling jar, having a silicon rubber gasket to minimize contamination, was charged with 20 grams of sodium chloride and 30 grams of absolute (200 proof) ethyl alcohol. The suspension was ball milled for three days, at which point 10 grams of propylene glycol, 10 grams of xylene, and an additional 30 grams of absolute ethyl alcohol were added and the formulation was thoroughly mixed.

An aluminum integrating sphere was cleaned by immersion for a period of about 10 to 15 minutes in a 20% solution of sodium hydroxide at a temperature of about 40° C. The sphere was removed from the basic bath, rinsed with distilled water, and was then dipped for a period of about 5 minutes into an aqueous solution of about 1% hydrogen fluoride and 5% nitric acid, followed by a number of additional rinses with distilled water. The sphere was then dried and coated with an alkali metal silicate sizing solution to reduce porosity and to inhibit corrosion of the surface by sodium chloride. To prevent migration of alloying materials from the aluminum into the sodium chloride coating, the surface was next coated with a silicone resin (GE 602).

The coating composition was sprayed upon the integrating sphere by a conventional wet spray gun under controlled conditions of humidity at about 20% relative humidity. The interior surface of the sphere was given four individual coats of about ½ millimeter in thickness each, with a period of drying between each coat for about 5 to 10 minutes at 40° C. The coated sphere was left overnight in the 20% relative humidity condition at ambient temperature and then placed in a circulating oven at a temperature of about 40 to 50° C. After about 2 days in the oven, the coating turned from its initial gray appearance to a white reflective surface, whereupon the oven temperature was raised about 10° C. per day to about 70° C., where it was maintained for a period of about 48 hours. The heat was then progressively reduced at a rate of about 10° C. per hour and the sphere removed from the oven.

Inspection of the coated integrating sphere revealed that the coating was hard, adhered well and had an absolute total reflectance of 95% within the solar region, with the exception of a slight drop in reflectance of 0.5% at 1.35 microns and 1% at 1.9 microns. In addition, there was a drop to 75% reflectance at 0.3 micron. Moreover, the reflectivity of the coating surface was found to be non-specular and could adequately withstand considerable thermal and mechanical shock at temperatures from about −5 to 145° C. and up to about 18 G's random vibrations.

Other examples of specific formulations of the coating composition that have been found to be workable when processed in the manner of Example 1 are as follows:

Example 2

Ingredients: Relative parts (percent by weight)
- Sodium chloride _____ 10
- Propylene glycol _____ 7
- Xylene _____ 10
- Ethyl alcohol (100%) _____ 73

Total _____ 100

Example 3

Ingredients: Relative parts (percent by weight)
- Sodium chloride _____ 30
- Propylene glycol _____ 10
- Xylene _____ 15
- Ethyl alcohol (100%) _____ 45

Total _____ 100

Example 4

Ingredients: Relative parts (percent by weight)
- Sodium chloride _____ 15
- Propylene glycol _____ 7
- Toluene _____ 18
- Isopropyl alcohol _____ 60

Total _____ 100

Example 5

Ingredients:
- Sodium chloride _____ 22
- 1,3-butanediol _____ 12
- Butyl Cellosolve _____ 8
- Ethyl alcohol _____ 58

Total _____ 100

As described above, the formulated coating composition is applied to an integrating sphere in the form of a plurality of thin layers. By more comprehensive spraying techniques, requiring more precision and skill, the coating composition could be applied as a single layer. Consideration, however, must be given to the fact that in such a case care must be taken to prevent the applied coating from running or slumping.

While the invention has been particularly described with reference to a preferred embodiment, it will be understood by those skilled in the art that various changes in form and detail may be made without departing from the spirit and scope of the invention.

What is claimed is:

1. The method of forming a non-specular diffuse reflective coating on a substrate comprising forming a coating composition by combining about 10 to 30 parts by weight of a highly reflective, crystalline inorganic salt and a liquid vehicle, wherein said vehicle comprises about 5 to 15 parts by weight of a diol solvent having not more than one terminal hydroxyl group, about 0 to 20 parts by weight of an essentially non-solvent organic liquid wetting agent for said inorganic salt, and about 40 to 80 parts by weight of an alcohol dispersant-drying agent with minimal water absorption and high volatility; spraying said coating composition onto said substrate; and drying said coating composition.

2. The method of claim 1 wherein said inorganic salt is sodium chloride.

3. The method of claim 1 wherein said alcohol dispersant-drying agent is selected from the group consisting of ethanol and isopropanol.

4. The method of claim 1 wherein said diol is selected from the group consisting of 1,2-propanediol, 1,3-butanediol and 2,3-butanediol.

5. The method of claim 1 wherein said wetting agent is an organic liquid having a boiling point of about 100 to 175° C.

6. The method of claim 5 wherein said wetting agent is selected from the group consisting of xylene, toluene, tetralene and cellusolve.

7. The method of forming a non-specular diffuse reflective coating on a substrate comprising forming a coating composition by combining about 10 to 30 parts by weight of sodium chloride, about 5 to 15 parts by weight of a solvent selected from the group consisting of 1,2-propanediol, 1,3-butanediol and 2,3-butanediol, about 0 to 20 parts by weight of an essentially non-solvent wetting agent selected from the group consisting of xylene and toluene, and about 40 to 80 parts by weight of a dispersant-drying agent selected from the group consisting of ethanol and isopropanol spraying said composition onto said substrate, and drying said coating composition.

8. The method of claim 7 wherein said composition is applied in a plurality of layers, each not thicker than about ½ millimeter, and where each layer of said plurality of said layers is dried for about 5 to 10 minutes at an elevated temperature of about 40° C. prior to application of its succeeding layer, and, after application of the final layer of said plurality of layers, the coating is further dried for at least about four hours at ambient temperature and under low humidity conditions, and then baked at an elevated temperature.

9. The method of claim 8 wherein said baking is first for a period of about two days at about 40 to 50° C., and then, in succeeding increments of about 10° C. per day, to about 70 to 90° C., and, thereafter, the baked coating is slowly cooled.

10. A coating composition, suitable for forming a non-specular, diffuse reflective coating, consisting essentially of about 10 to 30 parts by weight of sodium chloride; about 5 to 15 parts by weight of a solvent selected from the group consisting of 1,2-propanediol, 1,3-butanediol, and 2,3-butanediol; about up to 20 parts by weight of an essentially non-solvent wetting agent selected from the group consisting of xylene and toluene; and about 40 to 80 parts by weight of a dispersant drying agent selected from the group consisting of ethanol and isopranpanol.

References Cited
UNITED STATES PATENTS

| | | | |
|---|---|---|---|
| 3,389,951 | 6/1968 | Eagler et al. | 117—35 R |
| 3,499,780 | 3/1970 | Etherington et al. | 117—35 S |
| 2,688,565 | 9/1954 | Raymond | 117—35 S |

RALPH S. KENDALL, Primary Examiner

W. E. BALL, Assistant Examiner

U.S. Cl. X.R.

106—285, 237 R